(12) United States Patent
Lin

(10) Patent No.: US 7,287,876 B2
(45) Date of Patent: Oct. 30, 2007

(54) COLD CATHODE FLUORESECENT LAMP LIGHTING DEVICE

(76) Inventor: Yu-Chu Lin, No. 477, Chung Shan N. Rd., Yung Kang (TW)

( * ) Notice: Subject to any disclaimer, the term of this patent is extended or adjusted under 35 U.S.C. 154(b) by 68 days.

(21) Appl. No.: 11/219,788

(22) Filed: Sep. 7, 2005

(65) Prior Publication Data

US 2007/0053187 A1    Mar. 8, 2007

(51) Int. Cl.
*F21V 23/02* (2006.01)
(52) U.S. Cl. ............ 362/260; 362/520; 362/522; 362/540; 362/490
(58) Field of Classification Search ........ 362/260, 362/217, 223, 244, 171, 178, 520, 522, 540, 362/332, 334, 335, 338, 489, 490, 806; 313/493, 313/634
See application file for complete search history.

(56) References Cited

U.S. PATENT DOCUMENTS

| 4,225,905 A * | 9/1980 | Moriyama et al. ........ 362/216 |
| 6,227,677 B1 * | 5/2001 | Willis ........................ 362/196 |

* cited by examiner

*Primary Examiner*—Sandra O'Shea
*Assistant Examiner*—Mark Tsidulko
(74) *Attorney, Agent, or Firm*—Rosenberg, Klein & Lee

(57) ABSTRACT

A cold cathode fluorescent lamp lighting device includes a lens cover, a cold cathode fluorescent lamp and a control box. The lens cover is a semicircular-shaped tube and includes a post having a threaded hole for insertion of a bolt. The cold cathode fluorescent lamp is circular and secured in the lens cover. The control box includes a control circuit to control the lighting of the cold cathode fluorescent lamp. The control box further comprises electric wires and a connector to be connected with a connector of the cold cathode fluorescent lamp.

2 Claims, 3 Drawing Sheets

COLD CATHODE FLUORESECENT LAMP LIGHTING DEVICE

BACKGROUND OF THE INVENTION

1. Field of the Invention

The present invention relates to a cold cathode fluorescent lamp lighting device, and more particularly to one having a lens cover provided with a cold cathode fluorescent lamp to save energy while the output power is unchanged.

2. Description of the Prior Art

A conventional vehicular light uses light emitting diodes to emit light through a transparent plastic cup. However, the light emitting from the cup is uneven due to the emission is made from several light emitting diodes.

SUMMARY OF THE INVENTION

It is the primary advantage of the present invention to provide a cold cathode fluorescent lamp lighting device, which emits even and bright light.

According to an aspect of the invention, there is provided a cold cathode fluorescent lamp lighting device comprising a lens cover, a cold cathode fluorescent lamp, and a control box, said lens cover being a semicircular-shaped tube, said cold cathode fluorescent lamp being circular and secured in said lens cover, said control box comprising a control circuit to control the lighting of said cold cathode fluorescent lamp, said control box being connected with said cold cathode fluorescent lamp;

said lens cover comprising a post with a threaded hole for insertion of a bolt;

said control box comprising electric wires and a connector for connection with a connector of said cold cathode fluorescent lamp.

It is another advantage of the present invention to provide a cold cathode fluorescent lamp lighting device, which is a power saver.

It is a further advantage of the present invention to provide a cold cathode fluorescent lamp lighting device, which is cost-effective.

DETAILED DESCRIPTION OF THE PREFERRED EMBODIMENT

Figure 1:
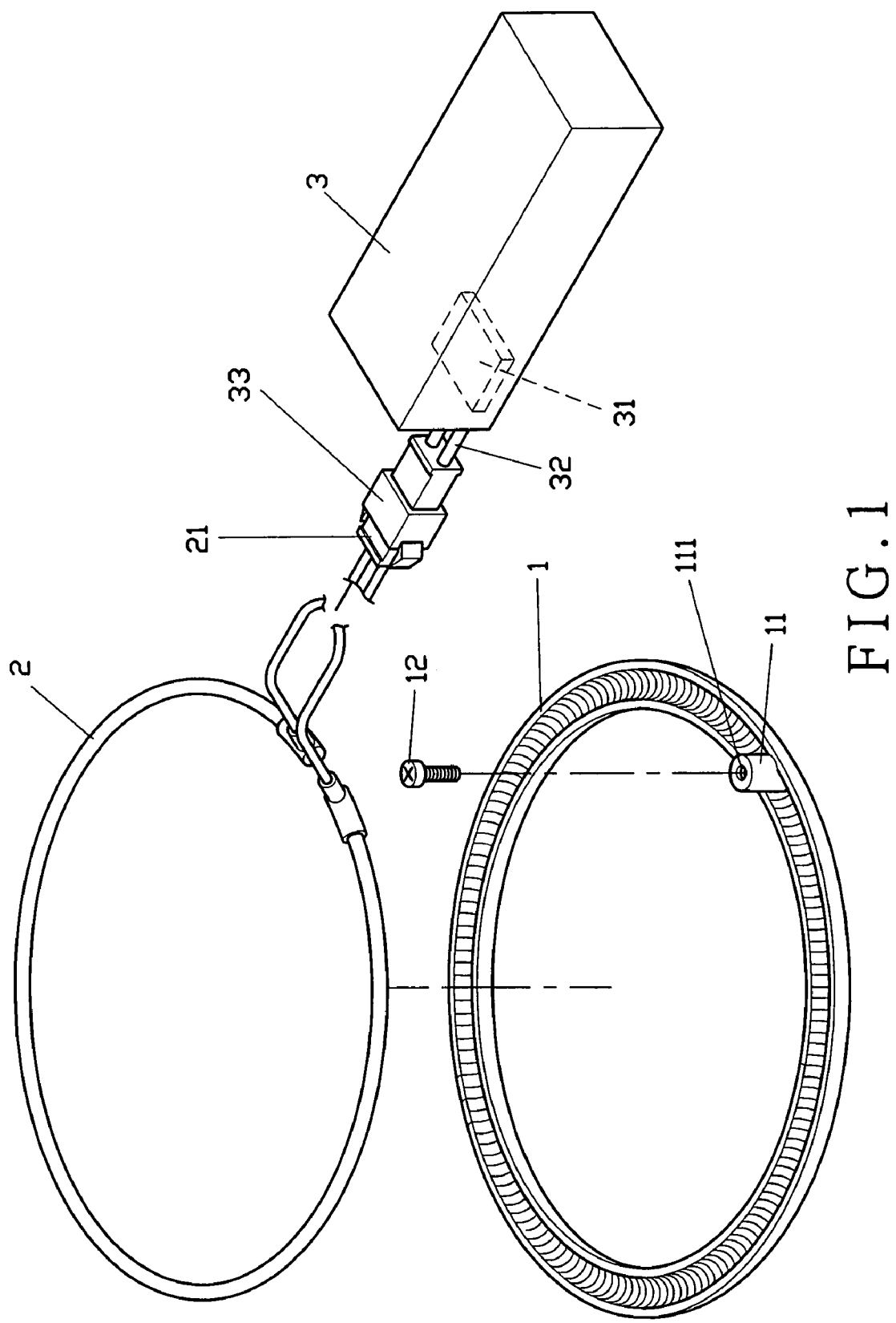
FIG. 1 is an exploded view of the present invention.
Figure 2:
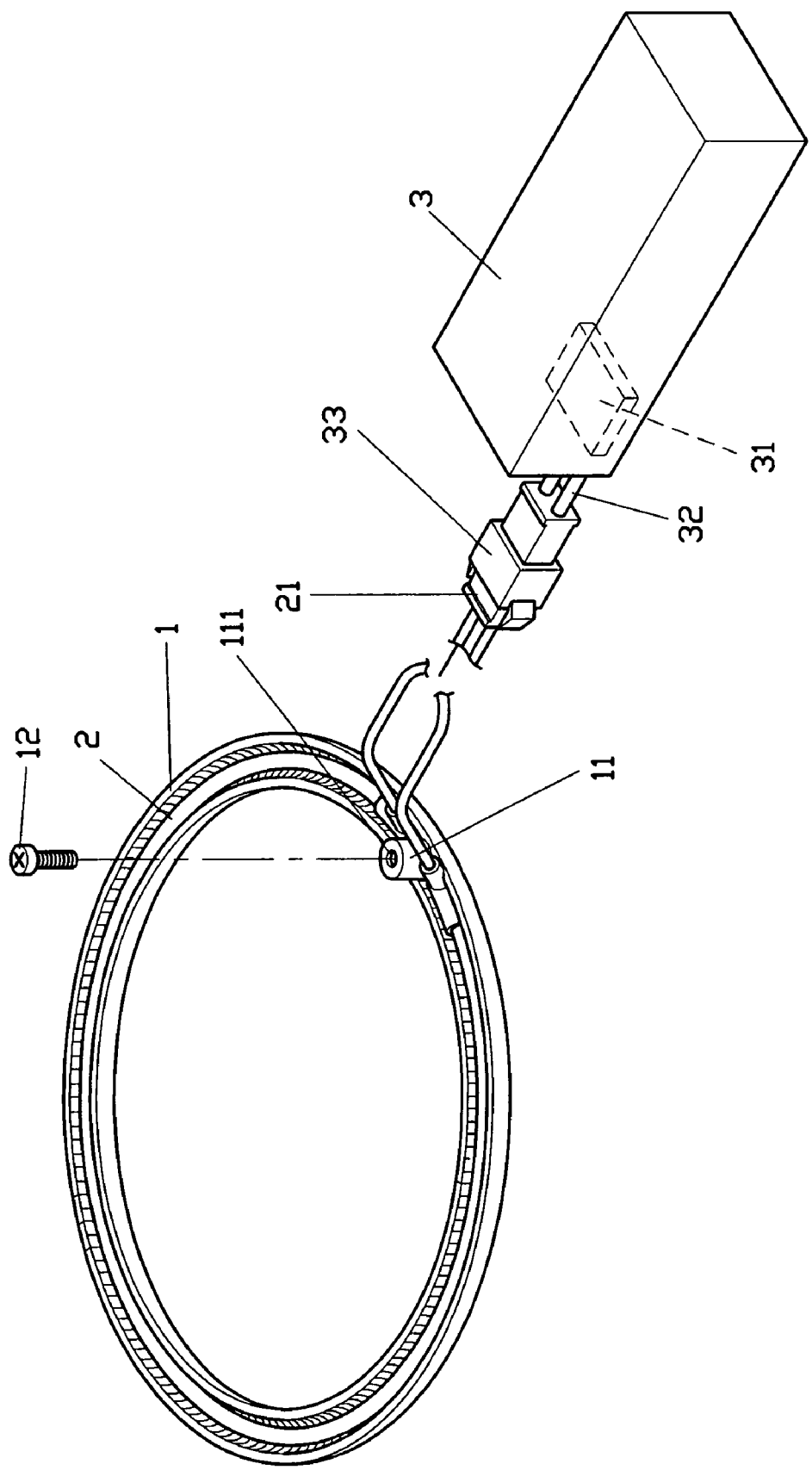
FIG. 2 is a perspective view of the present invention.

As shown in FIGS. 1 and 2, the present invention comprises a lens cover 1, a cold cathode fluorescent lamp (CCFL) and a control box 3.

The lens cover 1 is a semicircular-shaped tube and includes a post 11. The post 11 is provided with a threaded hole 111 for insertion of a bolt 12.

The cold cathode fluorescent lamp 2 is circular, and is secured in the lens cover 1.

The control box 3 includes a control circuit 31 adapted to control the cold cathode fluorescent lamp 2 to emit light. The control box 3 further comprises electric wires 32 and a connector 33 to be connected with a connector 21 of the cold cathode fluorescent lamp 2.

Figure 3:
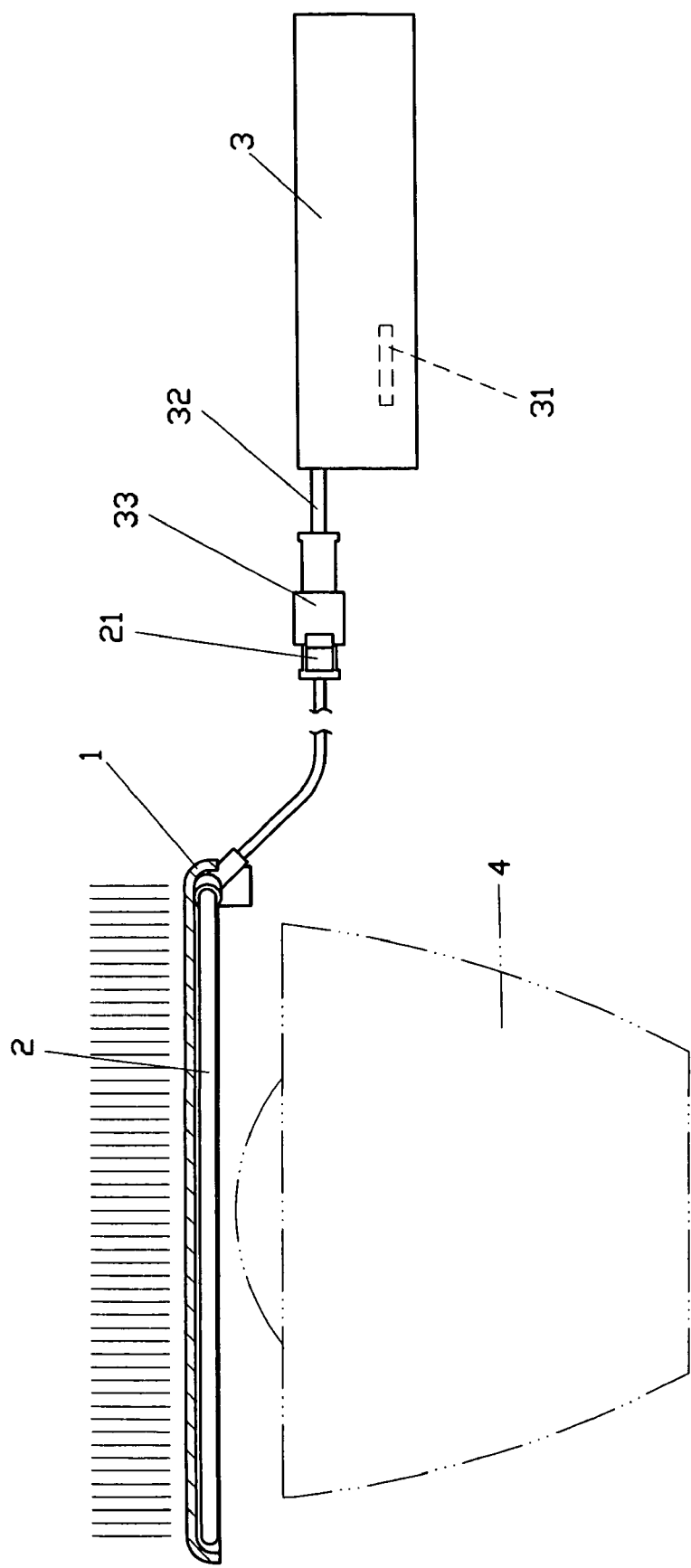
FIG. 3 is a side view of the present invention in an operating status.

As shown in FIG. 3, the present invention is secured to a vehicular light 4, with the control box 3 controlling the cold cathode fluorescent lamp 2 to emit light as needed. The cool light will pass through the lens cover 1, which is bright and saves more energy than a conventional light.

I claim:

1. A cold cathode fluorescent lamp lighting device comprising;
   a vehicle light;
   an annular lens cover having a semicircularly-shaped recess, said annular lens cover being disposed on said vehicle light to circumscribe a perimeter thereof;
   a substantially circular cold cathode fluorescent lamp, said cold cathode fluorescent lamp being secured within said recess of said lens cover and in contiguous contact with an inner wall of said lens cover; and
   a control box electrically connected to said cold cathode fluorescent lamp, said control box including a control circuit to control the lighting of said cold cathode fluorescent lamp.

2. The cold cathode fluorescent lamp lighting device, as recited in claim 1, wherein said lens cover comprises a post having a threaded hole for insertion of a bolt to secure said lens cover to said vehicle light.

* * * * *